Patented Sept. 1, 1931

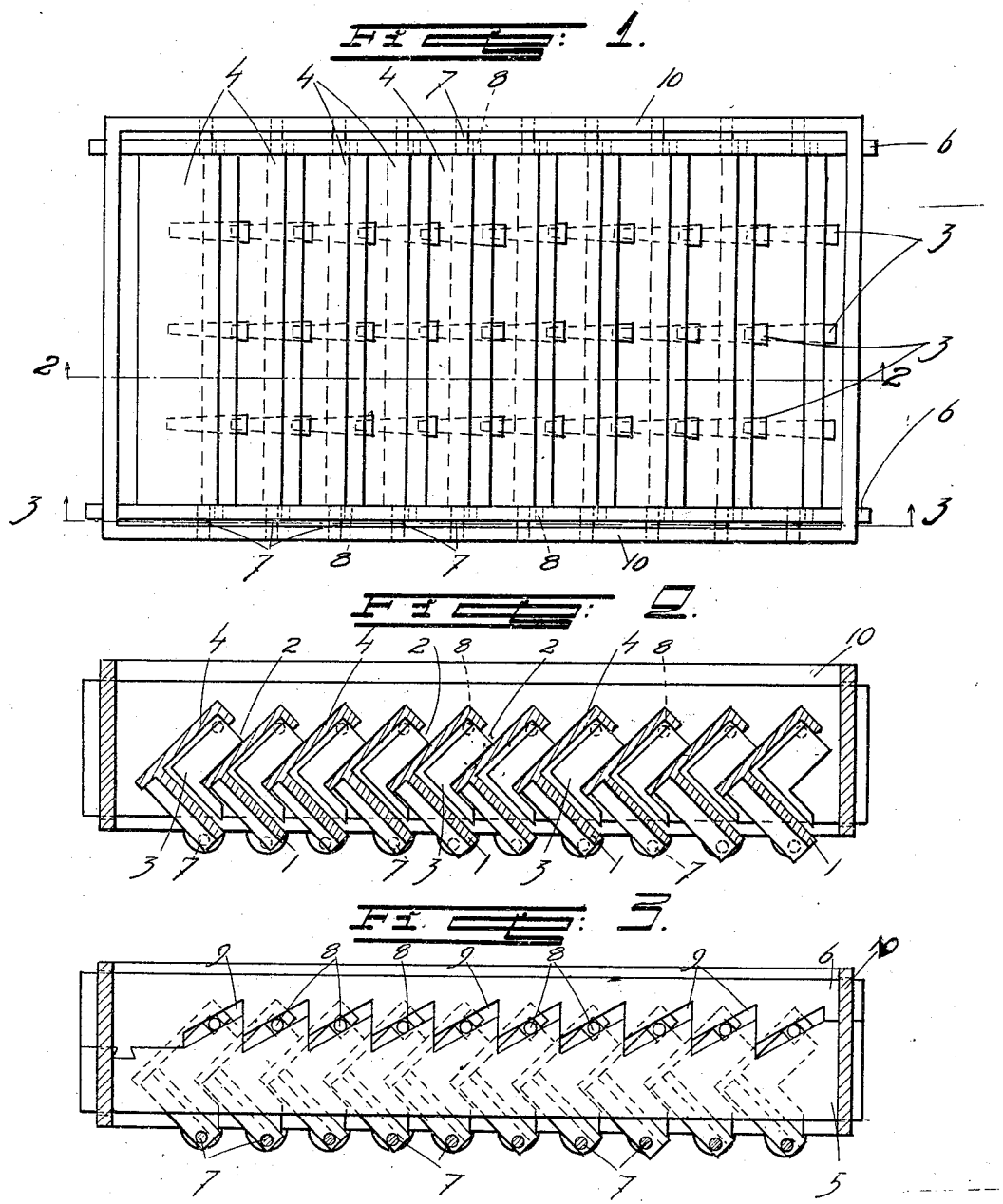

1,821,261

UNITED STATES PATENT OFFICE

AUGUST EMIL ERIKSSON, OF DALS LERDAL, SWEDEN

SIEVE

Application filed April 24, 1929, Serial No. 357,824, and in Sweden December 17, 1926.

This invention relates to an improvement in the bottoms of sieves for producing an increased effect in sifting objects of different length and size, irrespective of the specific gravity of the objects.

An embodiment of the invention is shown in the accompanying drawings, in which:

Fig. 1 is a plan view of the sieve, showing the openings of the sieve and a number of partitions between said openings.

Fig. 2 is a longitudinal section on the line 2—2 of Fig. 1, showing the form of the openings of the sieve and also the partitions between said openings.

Fig. 3 is a side view of a device for regulating the size of the openings of the sieve.

A sieve-bottom made of narrow laths 1 or the like forming cranny-like openings 2 through the bottom of the sieve, is substituted for the plate or sieve-cloth generally used in sieves. The openings 2 are divided by partitions 3 inserted in the openings in a number corresponding to the degree of sorting desired. Above the opening 2 roof-shaped laths 4 or the like connected to the laths 1, are placed in such a manner as to cause the objects to be sifted to alter their direction during the travel through the sieve.

The form of the openings 2 is to be seen in Fig. 2. The size of said openings is fitted in relation to the degree of sorting desired, so that the smaller the sifted objects are to be the smaller openings are employed, and inversely. Fig. 3 shows a device for regulating or causing the openings to be turned more or less upwards and thereby to act as larger or smaller openings, said device comprising two wedge-frames 5 and 6 connected to the bottom of the sieve and adapted to be moved to and fro and thereby raising or lowering shafts 8 fixed to the end-parts of the roof-shaped laths 4 and engaging the slot openings 9 between the upper and the lower wedge-frame. The laths 1 are at their ends provided with pivots 7 journaled in the sieve-frame 10. By moving the wedge-frame 5, 6 in one or the other direction the laths 1 and 4 connected to each other are swung upwards or downwards on the pivots 7, thereby regulating the size of the openings of the sieve.

As clearly shown in Fig. 2, the partitions 3 are attached to the outer side of the laths 4 but spaced from the adjacent one and from lath 1 to permit relative play of the laths.

Having now described my invention, what I claim as new and desire to secure by Letters Patent is:

1. A sieve, comprising a frame; a plurality of laths pivoted in said frame in parallel spaced relation; a plurality of roof-shaped laths connected to the first-mentioned laths; a partition between each two adjacent parallel laths to divide the openings made by the laths; a pair of wedge frames adapted to slide in the frame and having slot openings between the two wedge frames; and a shaft in each roof-shaped lath and projecting into a slot opening whereby movement of the wedge frames will increase or decrease the openings between the adjacent parallel laths.

2. A sieve, comprising a frame; a plurality of laths pivoted in said frame in parallel spaced relation; a partition between each two adjacent parallel laths to divide the openings made by the laths; a pair of wedge frames adapted to slide in the frame and having slot openings therebetween; and a shaft in each lath and projecting into a slot opening whereby movement of the wedge frames will increase or decrease the openings between the adjacent parallel laths.

3. A sieve, comprising a frame; a plurality of laths pivotally mounted in said frame in parallel spaced relation; a plurality of partitions arranged between each two adjacent laths and in spaced relation dependent upon the degree of sorting desired; a pair of wedge frames adapted to slide in the frame and having slot openings therebetween; and a shaft in each lath and projecting into a slot opening whereby movement of the wedge frames will increase or decrease the openings between the adjacent parallel laths.

4. A sieve, comprising a frame; a plurality of laths pivotally mounted in said frame in parallel spaced relation; a plurality of partitions arranged between each two adjacent laths and in spaced relation dependent upon the degree of sorting desired; a pair of wedge frames adapted to slide in the frame and having slot openings therebetween; and means on each lath and projecting into a slot opening whereby movement of the wedge frames will increase or decrease the openings between the adjacent parallel laths.

In witness whereof, I have hereunto signed my name.

AUGUST EMIL ERIKSSON.